Inventor
François Durand

Jan. 24, 1967   F. DURAND   3,299,729
TRANSMISSION MECHANISMS
Filed Oct. 7, 1964   2 Sheets-Sheet 2
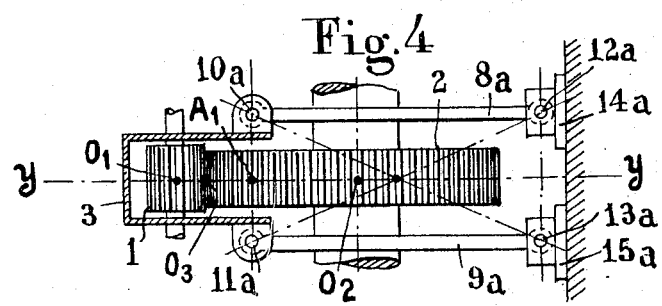
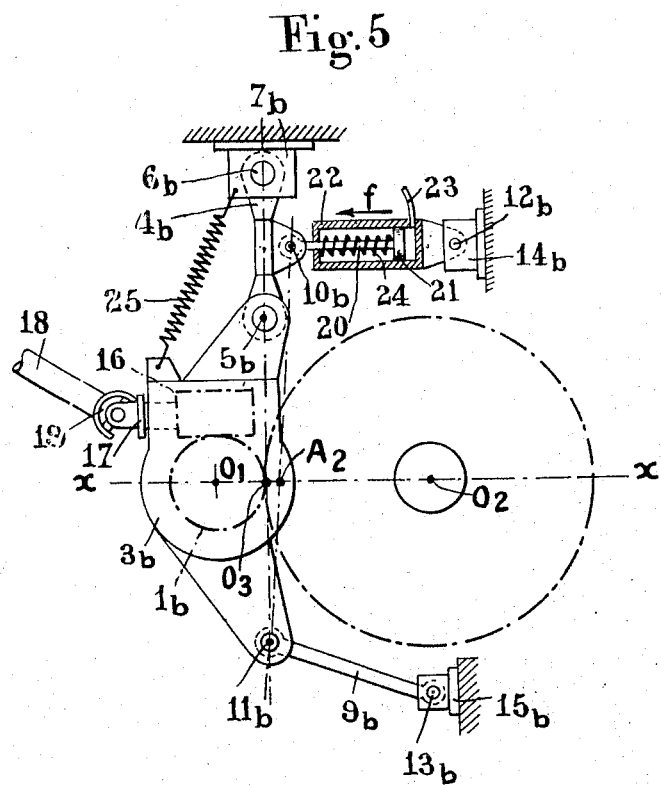
Inventor
François Durand
by Michael J. Striker United States Patent Office 3,299,729
Patented Jan. 24, 1967

3,299,729
TRANSMISSION MECHANISMS
Francois Durand, 108 Blvd. Carnot, Le Vesinet, France
Filed Oct. 7, 1964, Ser. No. 402,133
Claims priority, application France, Oct. 11, 1963,
950,309
7 Claims. (Cl. 74—411)

This invention relates to transmission mechanisms and has specific reference to means for transmitting a rotary motion from a pinion to a toothed gear wheel or annulus.

It is known that satisfactory driving and meshing conditions between a pinion and a toothed gear wheel or annulus are obtained if a certain directional freedom is given to the driving pinion so that its teenth may automatically engage the gear teeth with their entire surface area, even in case the toothed wheel displays deficiencies such as a certain degree of buckle.

It is also known that slight variations in the teeth engagement has no bearing on the operation of the transmission if the gear teeth outline is an involute curve, as in most instances.

It is the essential object of this invention to provide a transmission mechanism which is both simple and economical, and adapted to ensure an automatic adjustment of the driving pinion position to produce the optimum meshing engagement of same with the driven toothed gear.

To this end the present invention provides a transmission mechanism adapted to transmit the motion of a driving pinion to a toothed gear which comprises a pinion mounted in a separate case retained in the tangential direction by an anchor rod pivoted on a fixed point, characterized in that said case is also adapted to bear on a pair of pivoted bars disposed on either side of the plane containing the axes of the driving pinion and driven gear, the ends of said bars which are opposite to said case being pivotally mounted on a pair of fixed points, the pivotal mounting of said bars adjacent to the case being so arranged that their junction line intersects a perpendicular line common to the axes of said pinion and gear, which line merges substantially in the median plane of the teeth of said pinion and gear, at a point located on the same side as the axis of said toothed wheel with respect to the point of meshing engagement.

Various typical forms of embodiment are described hereinafter by way of example with reference to the accompanying diagrammatic drawings in which:

FIGURE 4 is a section taken upon the line IV—IV of FIGURE 3;

FIGURE 5 is an elevational view showing a third form of embodiment.

Figure 1:
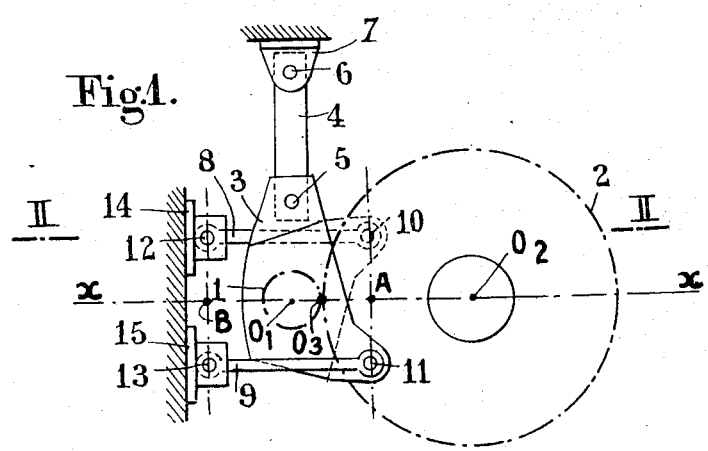
FIGURE 1 is a side elevational view showing a first form of embodiment of the transmission mechanism according to this invention.

Referring first to the form of embodiment illustrated in FIGURE 1, the transmission mechanism according to this invention comprises a single driving pinion 1 meshing with the toothed gear wheel or annulus 2 to be driven. In the example illustrated the axis of said toothed gear 2 (mounted on adequate support means) is disposed horizontally.

The pinion 1 is rotatably mounted in a case 3 independent of the toothed-gear support. This case may also enclose, if desired, a primary reducing gearing for driving said pinion and which is coupled with a driving shaft.

This case 3 is held against motion in the tangential direction by an anchor rod 4 having its ends pivotally mounted respectively at 5 on said case and at 6 on a fixed mounting support or bracket 7. In the example illustrated this anchor rod 4 extends vertically and supports the weight of the assembly comprising the pinion 1 and its case 3, as well as the primary gearing driving said pinion, if necessary.

Also pivotally mounted on said case 3 are two bearing bars 8, 9 adapted to constitute reaction members therefor. These bars have their ends pivoted at 10, 11 respectively on said case 3, and at 12, 13 on a pair of fixed supports 14, 15.

These two bearing bars 8, 9 are substantially parallel to the plane containing the axes $0_1$ and $0_2$ of said pinion and gear respectively. On the other hand, these two bars are disposed on either side of this plane. Finally, they are located on either side of the two lateral faces of said toothed gear 2.

According to the essential feature characterizing the transmission mechanism of this invention, as exemplified in the various forms of embodiment shown and disclosed herein, the pivotal mounting of the two bearing bars 8, 9 adjacent to said case 2, that is, pivot pins 10 and 11, are so arranged that their theoretical junction line 10–11 intersects a perpendicular line $x$—$x$ common to the pinion axis $0_1$ and to the gear axis $0_2$, said perpendicular line merging, or being contained, substantially in the median plane $y$—$y$ of the teeth of said pinion and gear. This feature is advantageous in that the pinion 1 and its case 3 are kept in a balanced position. According to another feature characterizing this invention the junction line between the pivot pins 10 and 11 intersects the above-defined line $x$—$x$ at a point A disposed on the same side of the axis $0_2$ of said toothed gear with respect to the median meshing point $0_3$. This "median" meshing point corresponds of course to the intersection between the meshing line of the pinion teeth and gear teeth, on the one hand, and the median plane of these teeth, on the other hand.

This second feature characterizing this invention is advantageous in that it precludes any risk of unbalance in the pinion operation, notably when spur gearings are used.

In the specific form of embodiment illustrated in FIGURE 1, the various pivot pins of the two bearing bars 8, 9 are so arranged that the first feature set forth hereinabove in connection with pivot pins 10, 11 located adjacent the case 3 also applies to each junction line between any one of the pivot pins of one of the two bearing bars and any one of the pivot pins of the other bearing bar. In fact, the junction line between the two pivot pins 12 and 13 disposed on the other side of case 3 will also intersect the perpendicular line $x$—$x$ common to the pinion axis $0_1$ and to the gear axis $0_2$, which perpendicular line contains the median plane $y$—$y$ of the pinion and gear teeth. This junction line 12, 13 will thus intersect the perpendicular line $x$—$x$ at point B. The junction line between the two pivot pins 10 and 13 will also intersect this line $x$—$x$ at a point which, in this specific example, lies on the pinion axis $0_1$. The same also applies to the junction line between the two pivot pins 11 and 12.

Due to the specific arrangement of the mechanism constituting the subject-matter of this invention, the meshing efforts transmitted to the case 3 are received by the anchor rod 4 and the pair of bearing bars 8, 9. Thus, the case 3 is held in a balanced position due to the specific disposal of the two bearing bars 8, 9.

However, the three anchor and bearing members 4, 8, 9 are attached at their ends by means of universal or Hooke's joints, for example ball-and-socket joints, permitting angular movements in all directions.

Under these conditions the case 3 is free to assume by itself the position in space which corresponds to the best possible relative alignment of the teeth of pinion 1 with those of gear 2. Thus, the requirements for a proper meshing engagement between pinion and gear are obtained automatically.

Figure 2:
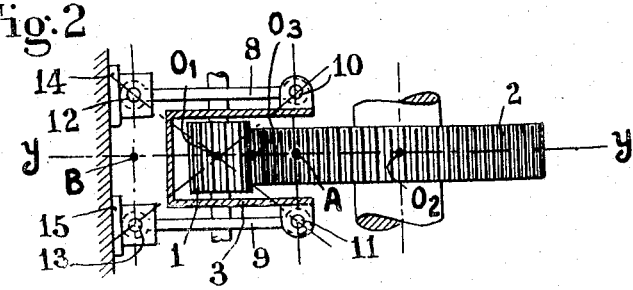
FIGURE 2 is a section taken upon the line II—II of FIGURE 1.
Figure 3:
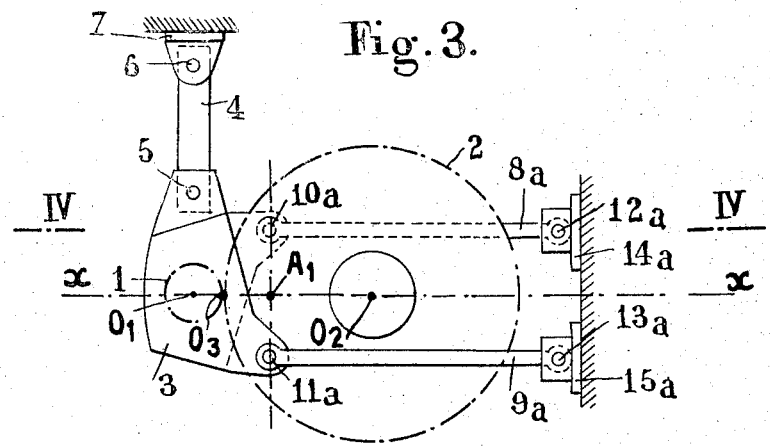
FIGURE 3 is an elevational view showing another form of embodiment of the device.

The alternate form of embodiment shown in FIGURE 2 differs from the preceding one only in that the two bearing bars 8a, 9a substituted for the bars 8, 9 respectively extend in the direction of the axis $O_2$ of the driven gear 2 and beyond this axis, instead of extending in an opposite direction. However, the ends of these two bars, which are opposite to the case 3 of pinion 1, are pivoted at 12a and 13a respectively on a pair of fixed supports, 14a, 15a.

Nevertheless, in this example as in the preceding one these two bearing bars 8a, 9a are substantially parallel to the plane formed by the axes $O_1$ and $O_2$ of the pinion and gear. Moreover, these bars are disposed both on either side of this plane and on either side of the two side faces of the toothed gear 2.

Besides, the two essential features characterizing the device of this invention are also found in this modified form of embodiment. In fact, the junction line between the pivotal mountings of the two bearing bars 8a and 9a on the case side, i.e. pivot pins 10a and 11a, intersects a perpendicular line $x$—$x$ common to the axis $O_1$ of pinion 1 and to the axis $O_2$ of the toothed gear 2, which perpendicular merges in the median plane $y$—$y$ of the pinion and gear teeth. This line 10a, 11a intersects the line $x$—$x$ at a point $A_1$ located on the same side as the axis $O_2$ of said toothed gear with respect to the meshing point $O_3$.

In this specific form of embodiment of the transmission mechanism of this invention the two bearing bars 8a, 9a are also so disposed that the junction line of any one of the pivot pins of one bar with any one of the pivot pins of the other bars intersects the perpendicular line $x$—$x$ common to the axis $O_1$ of pinion 1 and to the axis $O_2$ of gear 2, this perpendicular line merging in the median plane of the pinion and gear teeth. Thus, the conditions of operation of the device are the same as in the preceding case.

FIGURE 5 illustrates another form of embodiment of this invention. In this alternate arrangement the pinion 1b driving the toothed gear 2b is rotatably mounted in the case 3b enclosing the primary gear reduction unit 16 driving said pinion.

The input shaft 17 of this reduction unit is coupled with a power shaft 18 by means of a Hooke's or ball-and-socket joint 19. This case 3b is held against motion in the tangential direction by a anchor rod 4b having one end pivoted at 5b on this case and the opposite end pivoted at 6b on a fixed support 7b. This anchor rod extends vertically and carries the weight of the assembly comprising the pinion 1b, its case 3b and the primary gear reduction unit driving said pinion 1b.

A tension spring 25 interposed between the fixed support 7b and the case enclosing the primary gear reduction unit 16 supported in overhanging relationship by the pinion is adapted to counteract the tilting torque resulting from the inherent weight of the primary gear reduction unit 16.

As in the preceding forms of embodiment, the case 3b reacts through a pair of bearing bars 8b and 9b. The ends of these bars which are remote from the case are pivoted respectively at 12b and 13b on a pair of fixed supports 14b and 15b. However, only one of these bars, that is, bar 9b, is pivoted directly at 11b on the case; the other bearing bar 8b is pivoted at 10b not on the case 3b but on the anchor rod 4b holding this case in the tangential direction.

Nevertheless, the arrangement of the two pivot pins 10b and 11b is such that the first essential feature of this invention is also obtained in this construction. In fact, the junction line between the pivot pins of the two bearing bars on the side of the case 3b, that is, the junction line between pivot pins 10b and 11b, intersects a perpendicular line $x$—$x$ common to the axis $O_1$ of the driving pinion and to the axis $O_2$ of the driven gear. On the other hand, in this specific example the pivot pins 10b and 11b as well as the two bearing bars 8b and 9b are also disposed in the median plane of the teeth.

Besides, the second feature characterizing this invention is also obtained in this arrangement since the junction line between the two pivot pins 10b and 11b intersects the line $x$—$x$ at a point $A_2$ disposed on the same side of the axis $O_2$ of toothed gear 2 with respect to the meshing point $O_3$. Thus, in this alternate form of embodiment the driving pinion 1b is held in a balanced position under the same conditions as in the other examples. Moreover, this pinion will assume automatically the position in space which will enable its teeth to engage properly the teeth of the toothed gear or annulus, due to the various pivotal mountings of the anchor rod 4b and bearing bars 8a, 9b, all of which being Hooke's joints, ball-and-socket joints, or like universal joints.

However, according to a specific feature characterizing this form of embodiment, the bearing bar 8b has a variable length. In fact, this bar consists of a rod 20 carrying a piston 21 slidably mounted in a cylinder 22. The end of rod 20 which is opposite to piston 21 is pivoted at 10b on the anchor rod 4b as shown in the preceding example.

On the other hand, the end of cylinder 22 which is opposite to pivot pin 10b is pivoted at 12b on the fixed support 14b. A pressure-fluid supply line 23 is connected to a port opening into the bottom of this cylinder 22. A compression coil spring 24 surrounds the rod 20 within the cylinder 22 and tends to move the piston 21 towards the bottom of the cylinder and therefore to exert a tractive effort on the pivot pin 10b in the direction of the fixed support 14b. This effort tends to keep the case 3b in a position such that pinion 1b is in meshing engagement with the toothed gear 2b.

However, by delivering fluid under pressure into the cylinder 22 through the pipe line 23 the movement of piston 21 and rod 20 in the direction of the arrow $f$ may be effected while compressing the return spring 24. Thus, pivot pin 10b is moved away from pivot pin 12b and the upper portion of case 3b is moved away from the toothed gear 2b, and the pinion is disconnected from the toothed gear.

Under these conditions, it is clear that the arrangement shown in FIGURE 5 permits of disconnecting the pinion from the toothed gear at will.

Of course, the drive between pinion 1 and gear 2 may be re-established by simply exhausting the fluid under pressure delivered into the cylinder 22. On the other hand, the means for controlling the variation in length of the bearing bar 8b may differ from those illustrated. Thus, purely mechanical means may be used to this end.

Besides, the transmission mechanism according to this invention should not be construed as being limited by the different forms of embodiment shown and described herein by way of example, since many modifications may be brought thereto without departing from the spirit and scope of the invention, as set forth in the appended claims. Thus, in any one of the constructions illustrated in FIGURES 1, 2 and 3, 4 a variable-length bearing bar may be provided together with means for controlling the variation in length of this bar, so that the device may also permit of disconnecting the pinion from the toothed gear.

What I claim is:

1. A mechanism for transmitting motion to a toothed gear having peripheral teeth and mounted on a fixed frame structure, which comprises, in combination, a driving pinion meshing with the teeth of said gear; a mounting separate from said fixed frame structure, said pinion being rotatably mounted in said mounting; an anchor rod connecting said mounting to a fixed point of said frame structure and adapted to hold said mounting in the tangential direction with respect to said gear, said rod having its ends pivotally attached to said fixed point and said mounting, respectively; a pair of bearing bars connecting said mounting to a pair of fixed points on said frame structure, said bars being disposed on either side of a plane containing the axis of said pinion and the axis of said gear, the ends of said bearing bars being pivoted respectively on said mounting and on the two corresponding points of said frame structure; the pivot points of said pair of bearing bars on said mounting being so disposed that the theoretical junction line between said two pivot points intersects the perpendicular common to said pinion axis and said gear axis, said perpendicular being substantially contained in the median plane of the teeth of said pinion and gear, the point of intersection of said two lines being disposed on the same side as the gear axis with respect to the meshing points of said pinion and gear teeth.

2. A transmission mechanism as set forth in claim 1, wherein said various pivot points of said pair of bearing bars are so disposed that the theoretical junction line between any one of said pivot points of one of said bearing bars with any one of said pivot points of the other bar intersects the perpendicular common to said pinion and gear axes, which perpendicular is substantially contained in the median plane of the teeth of said pinion and gear.

3. A transmission mechanism as set forth in claim 1, wherein said pair of bearing bars are disposed on either side of said toothed gear, and are furthermore substantially parallel to the plane containing the axes of said pinion and gear.

4. A mechanism for transmitting motion to a toothed gear provided with a peripheral set of teeth and mounted on a fixed frame structure, which comprises, in combination, a driving pinion in meshing engagement with the gear teeth; a mounting separate from said fixed frame structure, said driving pinion being rotatably mounted on said mounting; an anchor rod connecting said mounting to a fixed point on said frame structure and adapted to hold said mounting in the tangential direction with respect to said gear, said anchor rod having its two ends pivotally mounted on said fixed point and on said mounting, respectively; a pair of bearing bars connecting said mounting to a pair of fixed points on said frame structure, said bearing bars being disposed on either side of the plane containing the axes of said pinion and gear, the ends of one of said bearing bars being pivoted respectively on said mounting and on one of said pair of fixed points on said frame structure, the ends of the other bearing bar aforesaid being pivoted, adjacent to said mounting, respectively on said anchor rod holding said mounting in the tangential direction and on the opposite side on the other one of said pair of fixed pivot points on said frame structure; the pivot points of said bearing bars, which are adjacent to said mounting, being so disposed that the theoretical junction line between said two pivot points intersects the perpendicular common to said pinion and gear axes, said perpendicular being substantially contained in the median plane of the teeth of said pinion and gear, the point of intersection between said two lines being disposed on the same side of the gear axis with respect to the point of meshing engagement of said pinion and gear.

5. A transmission mechanism as set forth in claim 1, wherein one of said bearing bars consists of a member having a variable length, said mechanism comprising in combination control means adapted to vary the length of said one bar.

6. A transmission mechanism as set forth in claim 4, wherein one of said bearing bars consists of a member having a variable length, said mechanism comprising in combination control means adapted to vary the length of said one bar.

7. A transmission mechanism as set forth in claim 4, wherein the bearing bar pivoted on said anchor rod for holding said mounting against motion in the tangential direction consists of a variable-length member, the mechanism further comprising in combination control means adapted to vary the length of said bar pivoted on said anchor rod.

References Cited by the Examiner

UNITED STATES PATENTS

| | | | |
|---|---|---|---|
| 2,175,086 | 10/1939 | Mitchell | 74—405 X |
| 3,122,939 | 3/1964 | Durand | 74—411 |
| 3,238,803 | 3/1966 | Durand | 74—409 |

FOREIGN PATENTS

| | | |
|---|---|---|
| 820,517 | 11/1951 | Germany. |
| 190,320 | 12/1922 | Great Britain. |

CARLTON R. CROYLE, *Primary Examiner.*